US008670459B2

(12) United States Patent
Barry et al.

(10) Patent No.: US 8,670,459 B2
(45) Date of Patent: Mar. 11, 2014

(54) APPARATUS AND METHOD OF SCHEDULING TIMING PACKETS TO ENHANCE TIME DISTRIBUTION IN TELECOMMUNICATION NETWORKS

(75) Inventors: Charles Frederick Barry, Santa Clara, CA (US); Tian (Alan) Shen, Cupertino, CA (US); Feng Frank Pan, San Jose, CA (US); DeviPrasad Natesan, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 453 days.

(21) Appl. No.: 12/628,088

(22) Filed: Nov. 30, 2009

(65) Prior Publication Data
US 2011/0128976 A1 Jun. 2, 2011

(51) Int. Cl.
*H04J 15/00* (2006.01)
(52) U.S. Cl.
USPC ........................................................ 370/464
(58) Field of Classification Search
USPC ........... 370/464, 474, 498, 503–520; 709/248
See application file for complete search history.

(56) References Cited

U.S. PATENT DOCUMENTS

| 7,274,691 | B2 * | 9/2007 | Rogers | 370/389 |
|---|---|---|---|---|
| 7,680,063 | B2 * | 3/2010 | Bedekar et al. | 370/252 |
| 8,077,614 | B2 * | 12/2011 | Ji et al. | 370/230 |
| 8,107,502 | B2 * | 1/2012 | Darras et al. | 370/503 |
| 2005/0058137 | A1 | 3/2005 | Neil et al. | |
| 2006/0268827 | A1 | 11/2006 | Makhijani et al. | |
| 2007/0014575 | A1 | 1/2007 | Kramer et al. | |
| 2008/0089364 | A1 | 4/2008 | Barry et al. | |

FOREIGN PATENT DOCUMENTS

| EP | 2026485 A1 | 2/2009 |
|---|---|---|
| KR | 10-2009-003664 | 4/2009 |

OTHER PUBLICATIONS

IEEE standard for a Precision Clock Synchronization Protocol, 1588, IEEE, 2008, 289 pages.*
PCT/US2010/058402, Applicant: Juniper Networks, Inc. Int'l Search Report (Aug. 10, 2011).
Andrews et al., "Minimizing End-To-End Delay in High-Speed Networks with a Simple Coordinated Schedule", Infocom '99, Eighteenth Annual Joint Conference of the IEEE Computer and Communications Societies Porceedings, IEEE New York, NY Mar. 21-25, 1999, Piscataway, NJ, IEEE, vol. 1, Mar. 21, 1999, pp. 380-388.

(Continued)

*Primary Examiner* — Dmitry H Levitan
(74) *Attorney, Agent, or Firm* — Cooley LLP (57) ABSTRACT

An apparatus and method of scheduling timing packets to enhance time distribution includes an improved apparatus in a system in which at least one of time and frequency information is derived based on information distributed in timing packets, at least some of the timing packets being transmitted by or received by the apparatus. The improvement includes a scheduling module that determines a first packet transmission time offset of a first timing packet based on a first predetermined identifier associated with the apparatus, and a second packet transmission time offset of a second timing packet based on the first packet transmission time offset and a timing packet spacing that is independent of the first predetermined identifier. The improvement further includes a transmission module that transmits the first timing packet based on the first packet transmission time offset, and the second timing packet based on the second packet transmission time offset.

25 Claims, 5 Drawing Sheets

(56) References Cited

OTHER PUBLICATIONS

Kyasanur et al., "Detection and Handling of MAC Layer Misbehavior in Wireless Networks", Proceedings 2003 International conference on Dependable Systems and Networks, DSN 2003, San Francisco, CA, Jun. 22-25, 2003, pp. 173-182.

Supplementary European Search Report issued to EP Patent Application No. 10834049, Sep. 7, 2012, 19 pgs.

* cited by examiner

APPARATUS AND METHOD OF SCHEDULING TIMING PACKETS TO ENHANCE TIME DISTRIBUTION IN TELECOMMUNICATION NETWORKS

FIELD OF THE INVENTION

The present invention relates generally to processing of packet traffic in telecommunication networks. More particularly, this invention is directed towards scheduling timing packets to enhance time distribution in telecommunication networks.

BACKGROUND OF THE INVENTION

In recent years, there has been a rapid increase in demand for delivery of real-time applications and services in computer networks, including Pseudo-Wire Emulation (PWE), Voice over IP (VoIP), video conferencing, and broadcast, multicast and manycast streaming services such as H.261, H.323, and IPTV. These real-time services typically require highly accurate timing to ensure high service quality. Highly accurate timing is also required at base stations in wireless networks based on technologies such as Global System for Mobile communications (GSM), Code Division Multiple Access (CDMA), WiMAX, and Long Term Evolution (LTE).

To ensure high service quality and to facilitate network management, it is desirable to eliminate clock mismatch between computer network equipment such as switches, routers, and base stations. This can be done by providing a highly accurate timing reference at each node, such as a Global Positioning System (GPS) reference or a lower quality oscillator such as a Stratum 2 rubidium oscillator, where the specification for Stratum 2 clock quality is given in Telcordia GR-1244-CORE. However, at the same time it is desirable to reduce the substantial cost resulting from per-node deployment of these timing references.

To reduce per-node cost, it is desirable to use a cheaper oscillator, such as an oven controlled crystal oscillator (OCXO) or a temperature controlled oscillator (TCXO), at each client node. However, OCXO's and TCXO's may be unable to meet Stratum 2 clock quality requirements, or the corresponding clock quality requirements for wireless networks defined in ITU-T G.823 SEC, 3GPP, and IEEE 802.16e. To solve this problem, one or more clock servers may provide timing through a data network to each client node. Each clock server may obtain timing derived from a Stratum 1 reference, such as the Global Positioning System (GPS) or a primary reference source locked to GPS. Each client may recover frequency and absolute phase information from this reference clock source.

One of the important factors that limits the accuracy of timing distribution in packet networks is variations in network delay, known as jitter or packet delay variation (PDV) over time, experienced by timing packets sent between a clock server and client nodes. Jitter is typically considered to include short-term variations in the packet delay. A quality of service (QoS) policy that is frequently applied to timing packets is Expedited Forwarding (EF). Among EF traffic and any other lower priority traffic, the EF traffic is queued and transmitted first. Even so, timing packets still can experience jitter resulting from the multiplexing of timing packets with other timing packets or with lower priority data packets. Many packet based systems use store-and-forward media access techniques. These systems typically receive an entire packet and queue the packet to an egress media access port. Before the packet can be transmitted on the egress port, any previous packet that is already in the process of being transmitted should be fully transmitted. This process of queuing before egress can cause a large jitter for any particular packet from any particular client device.

Figure 1:
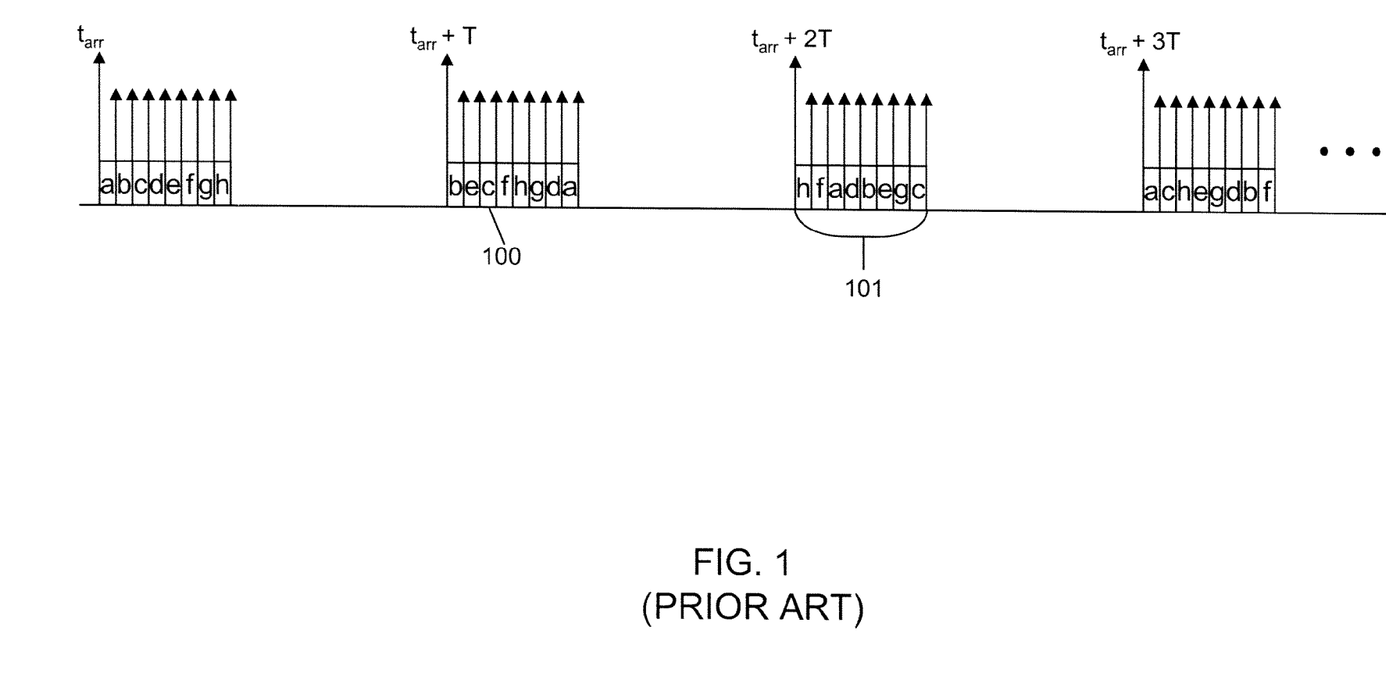
FIG. 1 illustrates an example of timing packets arriving at a server from multiple clients, in accordance with prior art.

When multiple clients transmit timing packets at regular intervals based on recovered absolute phase information, many of these timing packets tend to arrive at the network edge at approximately the same time, especially in networks in which the multiple clients are in relatively close proximity. These timing packets tend to accumulate in a burst of many packets that can then be forwarded to the server (or a set of servers). FIG. 1 illustrates an example of timing packets arriving at a server from multiple clients, in accordance with prior art. Timing packets 100 arriving at the server from each of eight clients are marked as "a" from the first client, "b" from the second client, and so on to "h" from the eighth client. One timing packet 100 is transmitted from each client during each time interval T, so that one timing packet 100 from each client arrives as part of a burst 101 of timing packets that arrives at the server during each time interval T. The bursts 101 arrive at the server starting at each of arrival times $t_{arr}$, $t_{arr}+T$, $t_{arr}+2T$, and so on. As illustrated in FIG. 1, during any given time interval T, the timing packets 100 transmitted by a given client may arrive first, last, or elsewhere in the burst. The order of the timing packets 100 in each burst depends on many factors such as the accuracy of the phase estimation at each client, the recovered frequency at each client, and queuing effects within the network traversed by the timing packets.

The recovered frequency and phase at each client typically includes jitter and wander. Wander is typically considered to include long term variations in the packet delay, such as on the order of one-tenth of a second or greater. This jitter and wander in the recovered frequency and phase can increase as a result of the increased jitter experienced by timing packets as a result of the bursting and variation in ordering of timing packets illustrated in FIG. 1. In addition, increased wander in the recovered frequency and phase can lead to slowly varying variations in the ordering of timing packets, which can lead to further increases in the wander of the recovered frequency and phase. The magnitude of the wander can be on the order of milliseconds, which far exceeds the absolute phase accuracy requirement of about 3 microseconds for wireless protocols such as CDMA, TD-SCDMA and LTE-FDD. This base station to base station phase accuracy requirement is needed to maintain call quality, reduce interference, and avoid dropped calls.

It is therefore desirable to determine how to reduce the likelihood and length of bursts of timing packets in telecommunication networks, especially in networks including multiple clients that transmit timing packets at regular intervals based on recovered absolute phase information.

SUMMARY OF THE INVENTION

An apparatus and method are described that schedule timing packets to enhance time distribution in telecommunication networks. One embodiment of the invention includes an improved apparatus in a system in which at least one of time and frequency information is derived based on information distributed in timing packets, at least some of the timing packets being transmitted by or received by the apparatus. The improvement comprises a scheduling module that determines a first packet transmission time offset of a first timing packet based on a first predetermined identifier associated with the apparatus, and that determines a second packet transmission time offset of a second timing packet based on the first packet transmission time offset and a timing packet spacing that is independent of the first predetermined identifier. The improvement further comprises a transmission module that transmits the first timing packet based on the first packet transmission time offset, and that transmits the second timing packet based on the second packet transmission time offset.

A further embodiment of the invention includes an apparatus that schedules timing packets. The apparatus comprises a scheduling module that determines a first packet transmission time offset of a first timing packet, where the first packet transmission time offset is substantially randomly placed within a first time window of predetermined length, and that determines a second packet transmission time offset of a second timing packet based on the first packet transmission time offset and a timing packet spacing such that the second transmission time offset is within the first time window. The apparatus further comprises a transmission module that transmits the first timing packet based on the first packet transmission time offset, and that transmits the second timing packet based on the second packet transmission time offset.

BRIEF DESCRIPTION OF THE DRAWINGS

For a better understanding of the nature and objects of the invention, reference should be made to the following detailed description taken in conjunction with the accompanying drawings, in which.

DETAILED DESCRIPTION OF THE INVENTION

Figure 2:
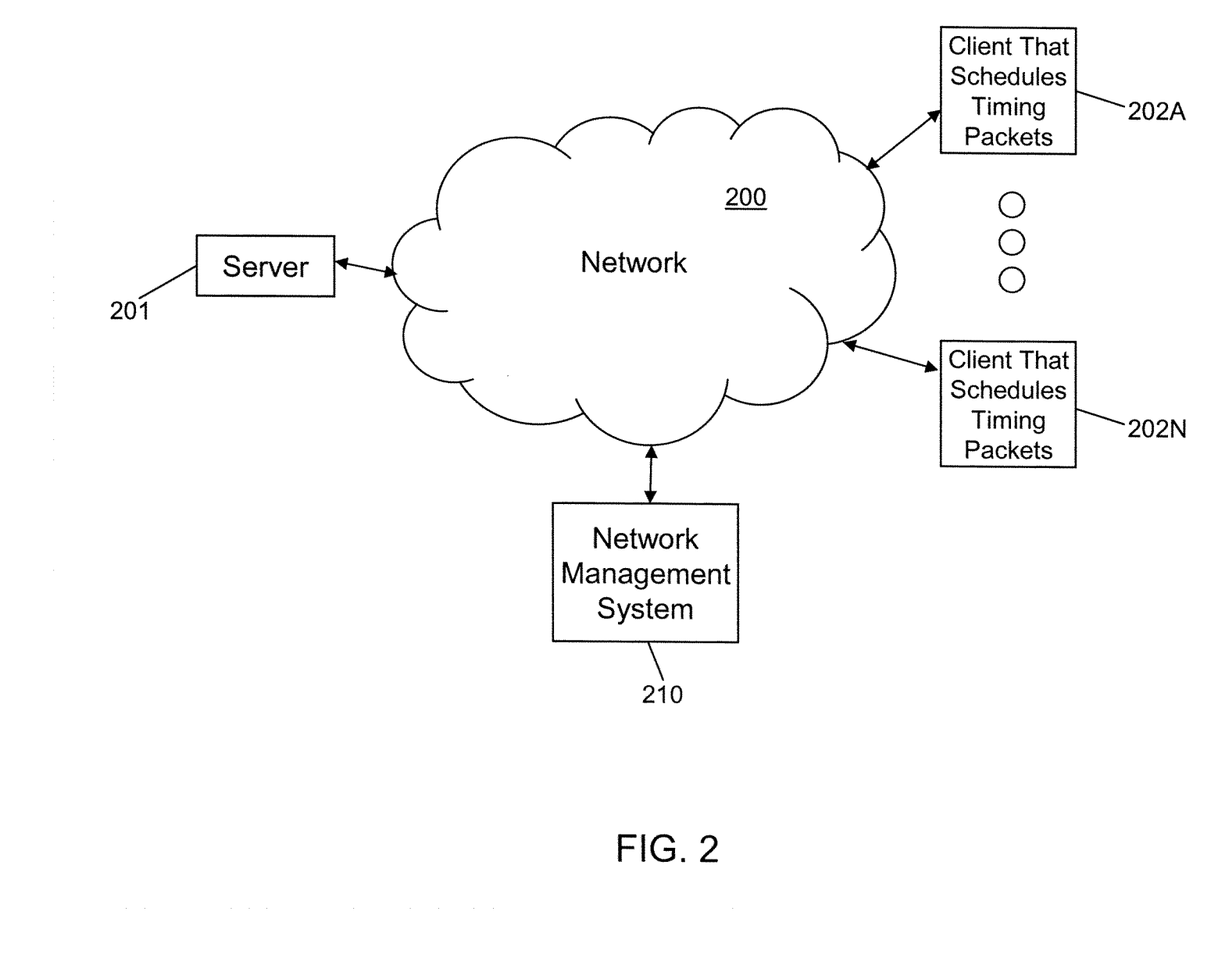
FIG. 2 illustrates a system including a time server and clients that schedule timing packets, in accordance with one embodiment of the present invention.

FIG. 2 illustrates a system including a time server 201 and clients 202A-202N that schedule timing packets, in accordance with one embodiment of the present invention. The time server 201 provides timing information to the clients 202 via a network 200. The transmission of packets in network 200 may be over fiber, copper, microwave, coaxial cable, or any other transmission medium. The packet communication may take place at any layer of the OSI stack including layer two (media access), layer three (networking), or higher layers. The time server 201 obtains timing from a master clock source (not shown), which may be a Stratum 1 referenced clock source, such as a primary reference clock derived from the Global Positioning System (GPS). The time server 201 may alternatively be referred to as the clock master 201. Each of the client devices 202 includes and obtains timing from a local client clocks (not shown). The client devices 202 may alternatively be referred to as the slaves 202. A client may be any networking device that requires frequency or time information in order to operate. Examples of clients are routers, switches, base stations, femtocells, home gateways, GPON, and home audio video bridging equipment. A network management system 210 may be used to configure and monitor the time server 201 and the client devices 202: The network management system 210 may communicate with the time server 201 and the client devices 202 using a network management protocol such as the Simple Network Management Protocol (SNMP).

The local client clocks are adjusted by the client devices 202 at least in part based on the timing information provided by the time server 201. The timing information may be provided in the form of timing packets that travel between the time server 201 and one or more of the client devices 202. These timing packets may traverse packet network 200.

With regard to FIG. 2, in one embodiment the timing packets may be generated using a timing distribution protocol such as the Network Time Protocol (NTP). The exchange of timing packets between the time server 201 and each client device 202 may be client-initiated. Each client device 202 may originate timing packets that are sent to the time server 201, then are returned by the time server 201 to each client device 202. Alternatively, each client device 202 may originate timing packets that are sent to the time server 201, and in response, the time server 201 may originate timing packets that are sent to each client device 202.

Figure 3:
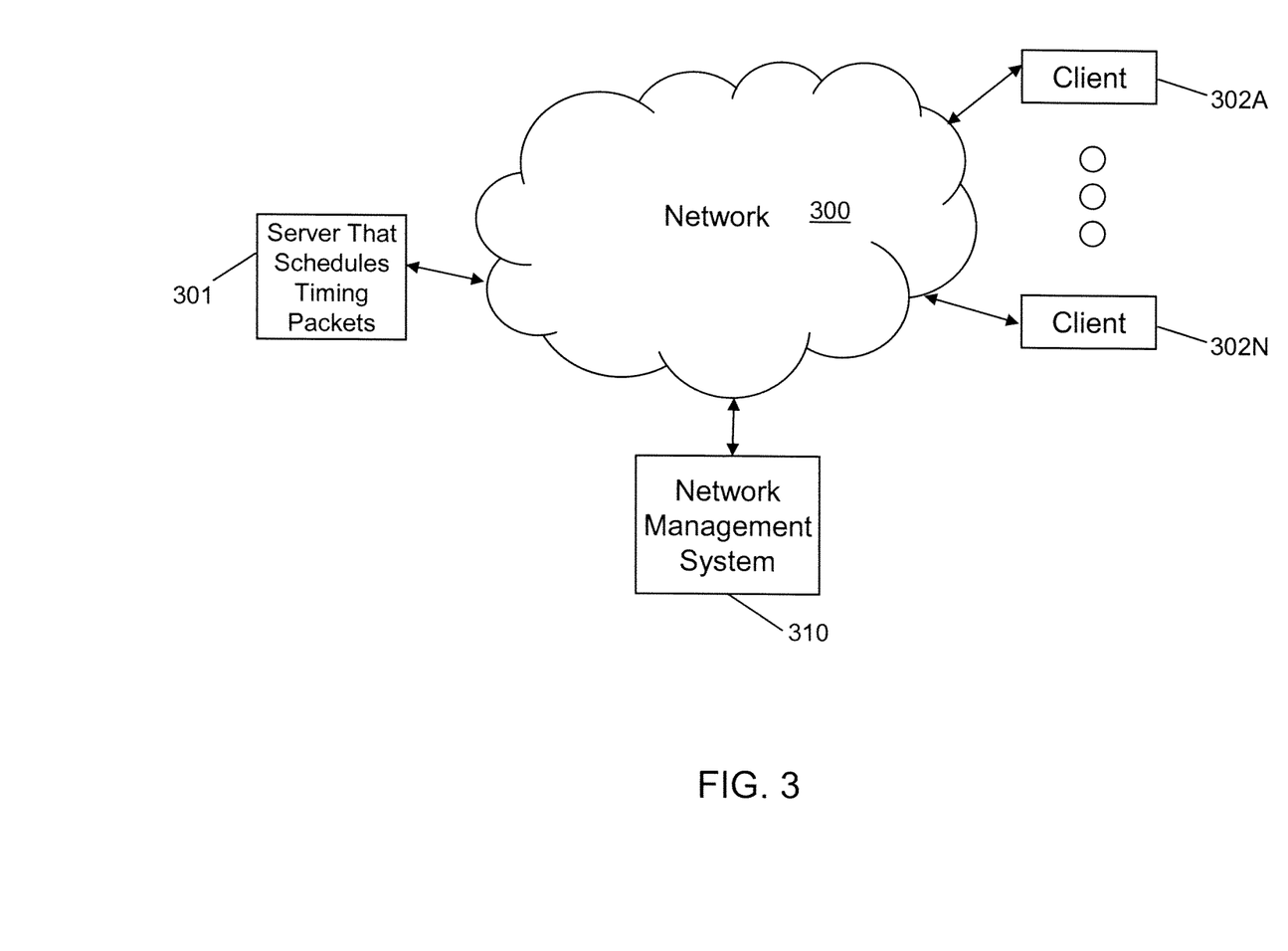
FIG. 3 illustrates a system including a time server that schedules timing packets and clients, in accordance with one embodiment of the present invention.

FIG. 3 illustrates a system including a time server 301 that schedules timing packets and clients 302A-302N, in accordance with one embodiment of the present invention. As described above for FIG. 2, the time server 301 provides timing information to the clients 302 via a network 300, and a network management system 310 may be used to configure and monitor the time server 301 and the client devices 302. The time server 301 obtains timing from a master clock source (not shown), and the clients 302 each obtain timing from a local client clock (not shown), as described above for FIG. 2. The local client clocks are adjusted by the client devices 302 at least in part based on the timing information provided by the time server 301. The timing information may be provided in the form of timing packets that travel between the time server 301 and one or more of the client devices 302. These timing packets may traverse packet network 300.

With regard to FIGS. 2 and 3, in one embodiment the timing packets may be generated using a timing distribution protocol such as the IEEE 1588 Precision Time Protocol (PTP). For example, the time server 301 may send a unicast sync packet to each client device 302. Each client device 302 may respond to the unicast sync packet by sending a delay request packet to the time server 301. The time server 301 may then respond with a delay response packet to each client device 302.

FIG. 2 and FIG. 3 illustrate two approaches to reducing the likelihood and length of bursts of timing packets in telecommunication networks, especially in networks including multiple clients that transmit timing packets at regular intervals based on recovered absolute phase information. Both of these approaches are based on scheduling timing packets so that timing packets transmitted by multiple client devices are spread in time, rather than being transmitted at approximately the same time at each client device. By offsetting the transmission times of the timing packets so that the timing packets are spread in time, the likelihood and length of bursts of timing packets that are then forwarded to a time server can be reduced. As described in more detail below, the packet transmission time offsets of the timing packets may be determined in various ways, such as substantially randomly, based on a predetermined identifier associated with each client device, based on timing packet transmission rate offsets between client devices, or combinations of the above.

In FIG. 2, each client device 202 schedules the transmission of timing packets to the time server 201. This approach may be well suited for use to enhance timing distribution protocols such as NTP, in which the exchange of timing packets between the time server and each client device is client-initiated. This approach can also be used to enhance timing distribution protocols such as PTP. For example, clients may schedule the transmission of PTP delay request packets to a time server. In contrast, in FIG. 3, the time server 301 schedules the transmission of timing packets to each client device 302. This approach may also be used to enhance PTP. For example, a time server may schedule the transmission of PTP unicast sync packets to each client. Each client may then transmit a PTP delay request packet to the time server upon receipt of the unicast sync packet. The scheduling of unicast sync packets by the time server thus results in the spreading of transmissions of delay request packets by the clients. A potential advantage of the approach of FIG. 3 is that only the time server, not the clients, needs to perform processing related to packet transmission time offsets for timing packets.

Figure 4:
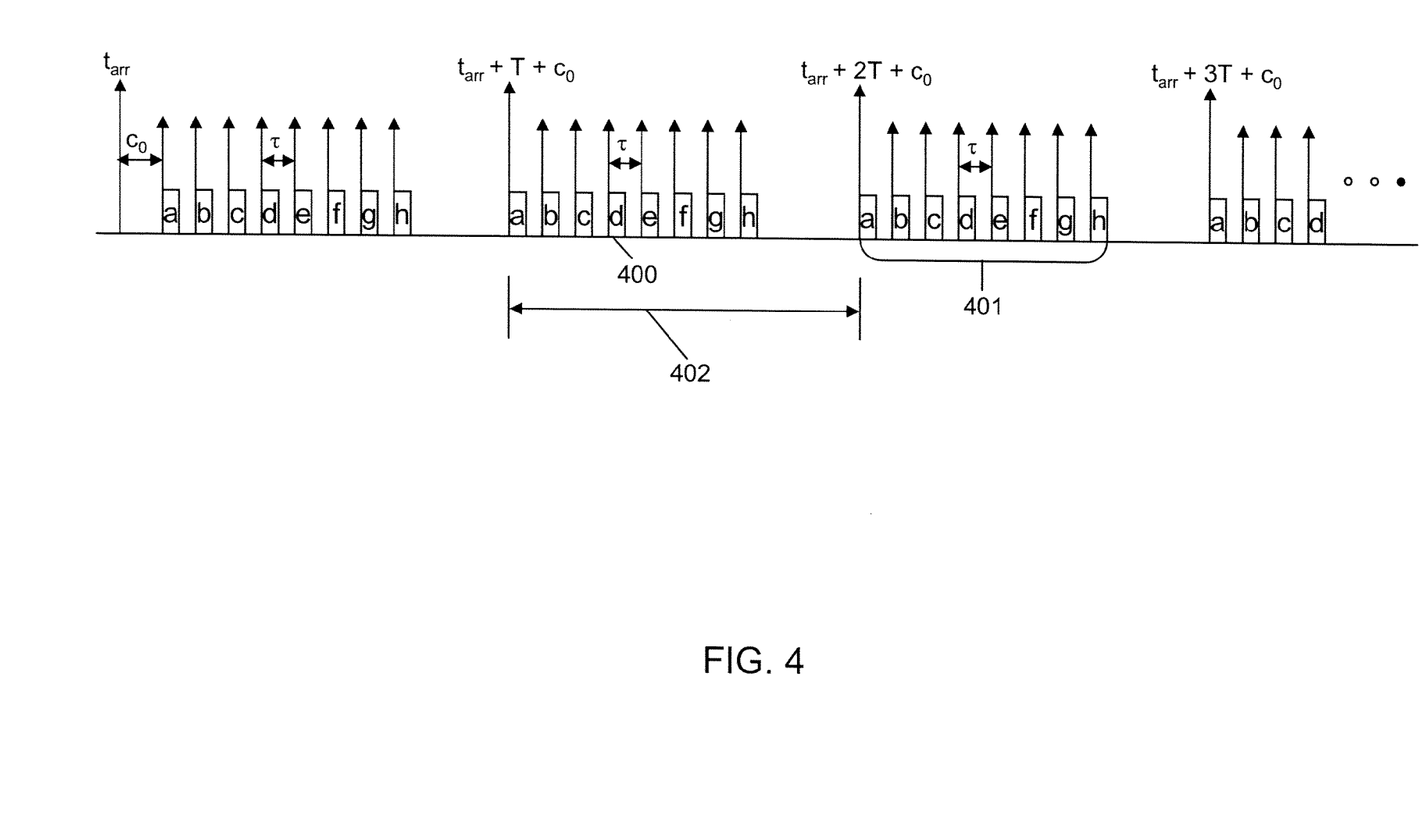
FIG. 4 illustrates an example of scheduled timing packets arriving at a time server from multiple clients, in accordance with one embodiment of the present invention.

FIG. 4 illustrates an example of scheduled timing packets arriving at a time server from multiple clients, in accordance with one embodiment of the present invention. FIG. 4 may correspond to the embodiments illustrated in FIGS. 2 and 3. Timing packets 400 arriving at the server from each of eight clients are marked as "a" from the first client, "b" from the second client, and so on to "h" from the eighth client. One timing packet 400 is transmitted from each client during each time interval 402 (denoted by T), so that one timing packet 400 from each client arrives as part of a burst 401 of timing packets that arrives at the server during each time interval T. The bursts 401 arrive at the server starting at or near each of arrival times $t_{arr}$, $t_{arr}+T$, $t_{arr}+2T$, and so on. The timing packets 400 in each burst 401 are offset from the start of the burst 401 by the sum of $c_0$, a constant phase offset from zero phase that may be non-zero, and a variable phase offset that varies depending on the client device that transmitted each timing packet 400. The variable phase offset of each timing packet 400 may be a multiple of a time constant $\tau$.

Note that FIG. 4 illustrates an idealized scenario, in that the packets 400 in each burst 401 arriving at the server are evenly spaced. Even if the packet transmission time offsets of the packets 400 are evenly spaced, jitter in the network traversed by the packets 400 on the way to the server will typically make the spacing of the timing packets 400 in each burst 401 time-varying.

Figure 5:
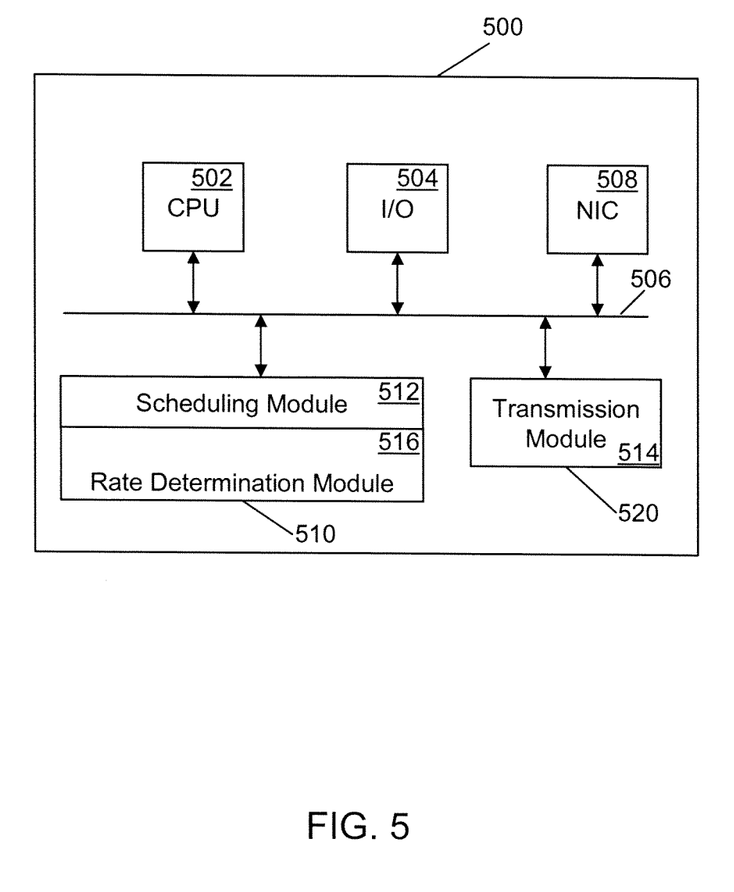
FIG. 5 illustrates an apparatus configured in accordance with one embodiment of the present invention.

FIG. 5 illustrates an apparatus 500 configured in accordance with one embodiment of the present invention. As described above for FIGS. 2 and 3, the apparatus 500 may be a time server and/or a client device. The apparatus 500 includes a central processing unit (CPU) 502 connected to a bus 506. Input/output devices 504 are also connected to the bus 506, and may include a keyboard, mouse, display, and the like. A network interface controller 508 connected to the bus 506 is the interface of the apparatus 500 to an external network such as network 200 or network 300. A memory 510 may include executable programs, such as programs for interfacing with a network management system 210 and/or 310. The memory 510 may also include a scheduling module 512 and a rate determination module 516. A transmission module 514 is also connected to the bus 506. The transmission module 514 may be implemented as part of a field programmable gate array (FPGA) and/or an application specific integrated circuit (ASIC) 520. Alternatively, the FPGA and/or ASIC 520 may implement the operations of the scheduling module 512, the transmission module 514, and the rate determination module 516.

The scheduling module 512 may determine a packet transmission time offset for a timing packet in various ways. In one embodiment, the packet transmission time offset may be determined based on a predetermined identifier associated with a client 202 and/or 302. For example, this identifier may include at least a portion of a serial number such as a manufacturer identifier, a MAC address, or an IP address. The predetermined identifier may be unique at least among the clients 202 and/or 302 that receive timing information from the time server 201 and/or 301. The packet transmission time offset can be determined as a linear or non-linear mapping, a hash, a cyclic redundancy check (CRC), as parity of some subset of the unique identifier bits, or by scrambling. Alternatives to linear mapping are, for example, useful when the predetermined identifier is obtained from Ethernet and IP addresses that may have a large number of bits that are common for a given network or subnetwork. The scrambling or coding of the bits is useful to spread the mappings in a more evenly distributed manner than is possible without scrambling or coding.

In one embodiment, the packet transmission time offset corresponding to each client 202 and/or 302 can be determined using a linear mapping. For example, the linear mapping may be based on the least significant 8 bits of the MAC address of each client 202 and/or 302. These 8 bits yield 256 distinct packet transmission time offsets. For example, if each of 256 clients 202 and/or 302 has a MAC address with a unique least significant 8 bits among the 256 clients 202 and/or 302, then the packet transmission time offset corresponding to each client 202 and/or 302 can be determined using the following exemplary mapping:

TABLE 1

Exemplary Mapping of Least Significant 8 Bits of MAC Address to Packet Transmission Time Offsets

| MAC Address (Least Significant 8 bits) | Mapping | Packet Transmission Time Offset |
| --- | --- | --- |
| 0x00 | 0 | 0 s |
| 0x01 | 1 | 1/2560 s |
| ... | ... | ... |
| 0xFF | 255 | 255/2560 s |

In this example, each client 202 and/or 302 transmits ten timing packets per second. Therefore, the 256 clients 202 and/or 302 may transmit an aggregate average rate of 2560 timing packets per second, or 256 timing packets per time interval of one-tenth of a second (corresponding to the time interval 402 in FIG. 4). In one embodiment, the packet transmission time offsets shown in Table 1 are for each tenth of a second, and are equally spaced by 1/(aggregate average rate of timing packets), or in this example 1/2560 seconds (about 391 microseconds). This mapping may be repeated for each tenth of a second so that the timing packet spacing of transmissions from each client 202 and/or 302 are also equally spaced (by 1 second, in this example). Alternatively, the packet transmission time offsets do not have to be spaced uniformly. In addition, the packet transmission time offsets do not need to be over the full period of the time interval of one-tenth of a second. For example, instead of being spaced by 391 microseconds over the full time interval of one-tenth of a second, the packet transmission offsets could be spaced by a smaller amount, such as 250 microseconds, over a portion of the time interval.

Alternatively, the packet transmission time offsets may be spaced by a value that is less than 1/(aggregate average rate of timing packets).

Alternatively, the packet transmission time offsets may be spaced by a value that is greater than 1/(aggregate average rate of timing packets). For example, if client MAC addresses are relatively uniformly distributed, then if there are a large number of client devices 202 and/or 302, such as 8,192, then using the mapping shown in Table 1, there could be multiple clients per packet transmission time offset shown in Table 1. Even so, there will be on average 8,192/256 or 512 clients 202 and/or 302 that may transmit timing packets at or near the same time, rather than the 8,192 clients 202 and/or 302 that may transmit packets at or near the same time if packet transmission time offsets were not used. This should also enhance the phase wander and frequency accuracy of the client timing recovery.

In one embodiment, the first predetermined identifier may be based on the least significant 14 bits of the MAC address of each client 202 and/or 302. Relative to the start of each second, the packet transmission time offset may be determined by mapping the least significant 14 bits of the MAC address to a corresponding integer from 0 to 16,384, multiplying this integer by 13 microseconds (spacing of packet transmission time offsets), and adding a 3 microsecond constant phase offset.

In another embodiment, the first predetermined identifier may be determined based on information received by the client 202 and/or 302. For example, the MAC address of the client 202 and/or 302 may be determined using the Address Resolution Protocol (ARP). The IP address of the client 202 and/or 302 may be determined using reverse ARP. Alternatively, the IP address of the client 202 and/or 302 may be set using the Dynamic Host Configuration Protocol (DHCP).

In one embodiment, the mapping of a predetermined identifier to a packet transmission time offset can be done based on any subset of the bits in the predetermined identifier, and does not have to be a contiguous subset. For example, the mapping could be done over the first and last bytes of the MAC address of a client 202 and/or 302.

In one embodiment, the packet transmission time offset may be determined based on a first predetermined identifier as well as a burst transmission time offset. The portion of the packet transmission offset determined based on the first predetermined identifier can be determined as described above. The burst transmission time offset may be determined based on a second predetermined identifier. The burst transmission time offset refers to the start of a burst of timing packets transmitted by a given client device 202 and/or 302. For example, a given client device 202 and/or 302 may transmit timing packets for a portion of a time window of predetermined length, such as for a 16-second or 18-second period during a 128-second time window. The burst transmission time offset refers to the time offset from the beginning of the time window at which a given client 202 and/or 302 begins transmitting a burst of timing packets. This burst of timing packets may cross over a time boundary between adjacent 128-second time windows. An exemplary mapping to determine the burst transmission time offset is shown in Table 2, with a burst transmission time offset spacing of 1 second:

TABLE 2

Exemplary Mapping of Least Significant 7 Bits of
MAC Address to Burst Transmission Time Offsets

| MAC Address (Least Significant 7 bits) | Mapping | Burst Transmission Time Offset |
|---|---|---|
| 0x00 | 0 | 0 s |
| 0x01 | 1 | 1 s |
| ... | ... | ... |
| 0x7F | 127 | 127 s |

In the example above, one reason to determine a packet transmission time offset based on a burst transmission offset relative to the start of a 128-second time window as well as a first predetermined identifier is that likelihood and length of bursts of timing packets received at a time server 201 and/or 301 can be further reduced.

In the above embodiments, the timing packet spacing between adjacent timing packets transmitted by each client 202 and/or 302 is independent of the value of each predetermined identifier. For example, the time interval 402 (one-tenth of a second in the example of Table 1) is not related to the least significant 8 bits of any individual client MAC address.

In another embodiment, the scheduling module 512 may determine the packet transmission time offset in a substantially random manner. The term "substantially random", as used in this specification, includes pseudo-random number generation as well as other random number generation approaches, such as generation of random numbers from physical processes such as thermal noise. A seed from which the random numbers are generated may be derived from a predetermined identifier, as described earlier. Alternatively, the seed may be determined based on a field in another timing packet received by the client 202 and/or 302. For example, the sequence number of a received PTP timing packet can be used as the seed.

For example, timing packets can be transmitted from each client 202 and/or 302 with a timing packet spacing that is substantially randomly spaced so long as the number of packets transmitted by each client 202 and/or 302 in a time window is held constant. This time window may correspond to the time window described in the previous discussion of burst transmission time offset.

In another embodiment, the scheduling module 512 may determine the packet transmission time offset based on both a mapping of a predetermined identifier and one or more random numbers generated in a substantially random manner. The offset mapping can be varied for each time interval 402 or over a larger time interval including multiple time intervals 402. For instance, the client 202 and/or 302 may generate a random number once per ten time intervals 402, recompute the mapping for the next ten time intervals 402 based on this random number, and apply this mapping to those ten time intervals. This has the effect of slowly mixing the mappings so that no one mapping is overloaded by a large number of clients all the time.

In one embodiment, the transmission module 514 transmits each timing packet based on its packet transmission timing offset. The rate determination module 516 may be used to set the rate of transmission of packets differently at different clients 202 and/or 302. The beating of clients 202 and/or 302 that are transmitting timing packets at different rates can be more readily filtered than the nearly DC wander that occurs when packets are transmitted at substantially the same rate from all clients 202 and/or 302.

Where this description refers to a packet transmission time offset being determined based on information determined at or received by a client 202 and/or 302, it will be understood that the packet transmission time offset may alternatively be determined based on similar information determined at or received by a time server 301 in the embodiment of FIG. 3.

It will be understood by one of ordinary skill in the art that combinations of the various techniques described above for determining packet transmission time offsets of timing packets may be used.

It will be understood by one of ordinary skill in the art that the embodiments described in this specification may distribute timing information using various forms of network traffic, including but not limited to packets. For example, the embodiments described in this specification may distribute timing information using cells or frames.

While various embodiments of the invention have been described above, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on chip ("SOC"), or any other device), implementations may also be embodied in software (e.g., computer readable code, program code, and/or instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages including Verilog HDL, VHDL, and so on, or other available programs. Such software can be disposed in any known computer usable medium such as semiconductor, magnetic disk, or optical disc (e.g., CD-ROM, DVD-ROM, etc.). The software can also be disposed as a computer data signal embodied in a computer usable (e.g., readable) transmission medium (e.g., carrier wave or any other medium including digital, optical, or analog-based medium). Embodiments of the present invention may include methods of providing the apparatus described herein by providing software describing the apparatus and subsequently transmitting the software as a computer data signal over a communication network including the Internet and intranets.

From the foregoing, it can be seen that an apparatus and method for scheduling timing packets to enhance time distribution in telecommunication networks are described. The foregoing description, for purposes of explanation, used specific nomenclature to provide a thorough understanding of the invention. It will be appreciated, however, that embodiments of the invention can be in other specific forms without departing from the spirit or essential characteristics thereof. The described embodiments are not intended to be exhaustive or to limit the invention to the precise forms disclosed; obviously, many modifications and variations are possible in view of the above teachings. The presently disclosed embodiments are, therefore, considered in all respects to be illustrative and not restrictive. The embodiments were chosen and described in order to best explain the principles of the invention and its practical applications; they thereby enable others skilled in the art to best utilize the invention and various embodiments with various modifications as are suited to the particular use contemplated. It is intended that the following claims and their equivalents define the scope of the invention.

What is claimed is:

1. A server, comprising:
a scheduling module configured to map or transform a subset of bits included in a predetermined identifier to a packet transmission time offset, the predetermined identifier being at least one of a manufacturer ID associated with a client device, a MAC address associated with the client device, or an IP address associated with the client device; and
a transmission module configured to delay transmission to the client device of a timing packet such that a packet transmission time of the timing packet is separated from a reference time by the packet transmission time offset;
the scheduling module being configured to determine a burst transmission time offset of a burst of timing packets including the timing packet, the burst transmission time offset being between the reference time and a start of the burst of timing packets; and
the packet transmission time offset being determined based on the burst transmission time offset and the packet transmission time offset.

2. The server of claim 1, wherein the subset of bits included in the predetermined identifier is a portion of a manufacturer identifier associated with the client device.

3. The server of claim 1, wherein the subset of bits included in the predetermined identifier includes a contiguous set of bits included in a least significant byte of the predetermined identifier.

4. The server of claim 1, wherein the scheduling module is configured to scramble the subset of bits included in the predetermined identifier to obtain the packet transmission time offset.

5. The server of claim 1, wherein:
the predetermined identifier is a first predetermined identifier; and
the burst transmission time offset is determined based on a second predetermined identifier associated with the client device.

6. The server of claim 5, wherein the second predetermined identifier is based on at least a portion of the at least one of the manufacturer ID associated with the client device, the MAC address associated with the client device, or the IP address associated with the client device.

7. The server of claim 5, wherein the second predetermined identifier is based on at least a portion of a manufacturer ID associated with the client device.

8. The server of claim 1, wherein the burst transmission time offset is substantially random, such that the start of the burst of timing packets is within a time window of predetermined length.

9. A server, comprising:
a scheduling module configured to determine a packet transmission time offset of a timing packet in a substantially random manner, the packet transmission time offset being determined based on a seed derived from a predetermined identifier associated with a client device; and
a transmission module configured to delay transmission to the client device of the timing packet such that a packet transmission time of the timing packet is separated from a reference time by the packet transmission time offset.

10. The server of claim 9, wherein the predetermined identifier is based on at least a portion of a manufacturer ID associated with the client device.

11. The server of claim 9, wherein the predetermined identifier is based on at least a portion of at least one of a manufacturer ID associated with the client device, a MAC address associated with the client device, or an IP address associated with the client device.

12. The server of claim 9, wherein:
the timing packet is a first timing packet; and
the scheduling module is configured to determine the packet transmission time offset from a seed derived from a field in a second timing packet received at the server.

13. The server of claim 9, wherein:
the timing packet is a first timing packet;
the packet transmission time is a first packet transmission time; and the transmission module is configured to transmit a second timing packet at a second packet transmission time separated from the first packet transmission time by a timing packet spacing that is between a start of the first timing packet and a start of the second timing packet.

14. A client device, comprising:
a scheduling module configured to determine a packet transmission time offset; and
a transmission module configured to delay transmission to a server of a timing packet such that a packet transmission time of the timing packet is separated from a reference time by the packet transmission time offset,
the scheduling module is configured to determine a burst transmission time offset of a burst of timing packets including the timing packet, the burst transmission time offset being between the reference time and a start of the burst of timing packets,
the packet transmission time offset is determined based on the burst transmission time offset and the packet transmission time offset.

15. The client device of claim 14, wherein the burst transmission time offset is determined based on a predetermined identifier associated with the client device.

16. The client device of claim 15, wherein the predetermined identifier is based on at least a portion of a manufacturer ID associated with the client device.

17. The client device of claim 15, wherein the predetermined identifier is based on at least a portion of at least one of a manufacturer ID associated with the client device, a MAC address associated with the client device, or an IP address associated with the client device.

18. The client device of claim 14, wherein:
the packet transmission time is within a first time window of predetermined length; and
the burst transmission time offset is substantially random, such that the start of the burst of timing packets is within a second time window of predetermined length longer than the first time window.

19. A client device, comprising:
a scheduling module configured to map or transform a subset of bits included in a predetermined identifier to a packet transmission time offset, the predetermined identifier being at least one of a manufacturer ID associated with the client device, a MAC address associated with the client device, or an IP address associated with the client device; and
a transmission module configured to delay transmission to a server of a timing packet such that a packet transmission time of the timing packet is separated from a reference time by the packet transmission time offset.

20. The client device of claim 19, wherein the subset of bits included in the predetermined identifier includes a contiguous set of bits included in a least significant byte of the predetermined identifier.

21. The client device of claim 19, wherein the scheduling module is configured to scramble the subset of bits included in the predetermined identifier to obtain the packet transmission time offset.

22. The client device of claim 19, wherein:
the scheduling module is configured to determine a burst transmission time offset of a burst of timing packets including the timing packet, the burst transmission time offset being between the reference time and a start of the burst of timing packets; and
the packet transmission time offset is determined based on the burst transmission time offset and the packet transmission time offset.

23. The client device of claim 22, wherein:
the predetermined identifier is a first predetermined identifier; and
the burst transmission time offset is determined based on a second predetermined identifier associated with the client device.

24. The client device of claim 23, wherein the second predetermined identifier is based on at least a portion of the manufacturer ID associated with the client device.

25. The client device of claim 22, wherein the burst transmission time offset is substantially random, such that the start of the burst of timing packets is within a time window of predetermined length.

* * * * *